(12) United States Patent
Barsness et al.

(10) Patent No.: US 10,108,703 B2
(45) Date of Patent: *Oct. 23, 2018

(54) NOTIFICATION OF POTENTIALLY PROBLEMATIC TEXTUAL MESSAGES

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Austin, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,572

(22) Filed: Aug. 11, 2017

(65) Prior Publication Data

US 2018/0089310 A1 Mar. 29, 2018

Related U.S. Application Data

(63) Continuation of application No. 15/276,877, filed on Sep. 27, 2016.

(51) Int. Cl.
*G06F 17/30* (2006.01)
*H04L 12/58* (2006.01)
(Continued)

(52) U.S. Cl.
CPC .. *G06F 17/30684* (2013.01); *G06F 17/30696* (2013.01); *H04L 51/04* (2013.01);
(Continued)

(58) Field of Classification Search
CPC ...... G06F 17/21; G06F 17/271; G06F 17/274; G06F 17/2785; G06F 17/30684;
(Continued)

(56) References Cited

U.S. PATENT DOCUMENTS 6,324,647 B1 11/2001 Bowman-Amuah
8,028,030 B2 9/2011 Edlund et al.
(Continued)

FOREIGN PATENT DOCUMENTS

CN 104333661 A 2/2015

OTHER PUBLICATIONS

Unknown, "Undo sending your mail", Gmail Help, Last Printed Apr. 12, 2016, 1 page.
(Continued)

*Primary Examiner* — Shew Fen Lin
(74) *Attorney, Agent, or Firm* — Peter J. Edwards (57) ABSTRACT

A computer may detect, during a first time period, a message written to a composer. The computer may analyze a first set of usage patterns of a composer's personal device that correspond to the first time period. The computer may also analyze a second set of usage patterns of the composer's personal device that correspond to a second time period. The computer may identify usage habits of the composer based on analyzing the second set of usage patterns. The computer may also identify a difference between the first set of usage patterns and the usage habits of the composer. The computer may determine that the composer was in an impaired state during the first time period based on the difference. The computer may then notify the composer of the difference.

1 Claim, 4 Drawing Sheets

(51) Int. Cl.
*H04W 4/14* (2009.01)
*H04W 4/22* (2009.01)
*H04W 4/02* (2018.01)
*H04W 4/90* (2018.01)

(52) U.S. Cl.
CPC .............. *H04W 4/02* (2013.01); *H04W 4/14* (2013.01); *H04W 4/22* (2013.01); *H04W 4/90* (2018.02)

(58) Field of Classification Search
CPC ... G06F 17/30696; H04L 51/00; H04L 67/22; H04L 51/04; H04W 4/02; H04W 4/14; H04W 4/90
See application file for complete search history.

(56) References Cited

U.S. PATENT DOCUMENTS

| | | | |
|---|---|---|---|
| 8,041,344 | B1 | 10/2011 | Coughlan et al. |
| 8,098,939 | B2 | 1/2012 | Oliver |
| 2002/0120748 | A1 | 8/2002 | Schiavone et al. |
| 2008/0005325 | A1 | 1/2008 | Wynn et al. |
| 2008/0012935 | A1 | 1/2008 | Echtenkamp |
| 2009/0241198 | A1* | 9/2009 | Takagi ................ G06F 21/6209 726/26 |
| 2010/0198931 | A1 | 8/2010 | Pocklington et al. |
| 2013/0047099 | A1 | 2/2013 | Markman et al. |
| 2013/0060863 | A1 | 3/2013 | D'eri et al. |
| 2015/0066832 | A1* | 3/2015 | Kulik ....................... H04L 63/14 706/47 |
| 2015/0310020 | A1* | 10/2015 | Brav ................... G06F 17/2785 707/730 |
| 2015/0341303 | A1 | 11/2015 | Lu |
| 2016/0173421 | A1* | 6/2016 | Alshinnawi ........... H04L 51/046 709/206 |
| 2016/0232922 | A1 | 8/2016 | Hickey et al. |
| 2017/0257329 | A1* | 9/2017 | Tetreault ............... H04L 51/046 |

OTHER PUBLICATIONS

Anonymous, "Method and system to automatically prevent social network system users from exchanging inappropriate content", An IP.com Prior Art Database Technical Disclosure, IP.com No. IPCOM000225704D, IP.com Electronic Publication Date: Feb. 27, 2013, 3 pages.

Barsness et al, "Notification of Potentially Problematic Textual Messages", U.S. Appl. No. 15/231,803, filed Aug. 9, 2016.

Barsness et al, "Notification of Potentially Problematic Textual Messages", U.S. Appl. No. 15/415,923, filed Jan. 26, 2017.

Barsness et al., "Notification of Potentially Problematic Textual Messages", U.S. Appl. No. 15/276,877, filed Sep. 27, 2016.

IBM, "List of IBM Patents or Patent Applications Treated as Related", Aug. 3, 2017, 2 pages.

* cited by examiner

NOTIFICATION OF POTENTIALLY PROBLEMATIC TEXTUAL MESSAGES

BACKGROUND

The present disclosure relates to textual communication interception, more particular aspects relate to intercepting potentially problematic textual communications.

The use of text-based communication systems (e.g., email messages, SMS messages, and social-media messaging systems) in the day-to-day lives of the population is increasing. Many users of text-based communication systems may have access to text-based communication capabilities for personal use, employment use, and others at all points throughout the day, every day of the week.

SUMMARY

Some embodiments of the present disclosure can be illustrated by program product comprising a computer readable storage medium having program instructions embodied therewith, the program instructions executable by a computer to cause the computer to detect, during a first time period, a message written by a composer. The computer may analyze a first set of usage patterns of a composer's personal device from the first time period. The computer may analyze a second set of usage patterns of the composer's personal device from a second time period. The computer may identify usage habits of the composer based on the analysis of the second set of usage patterns. The computer may identify a difference between the first set of usage patterns and the usage habits of the composer. The computer may determine that the composer was in an impaired state during the first time period, based on the difference. The computer may then notify the composer of the difference.

Some embodiments of the present disclosure can also be illustrated by a system comprising a processor and a memory in communication with the processor, the memory containing program instructions that, when executed by the processor, are configured to cause the processor to detect, during a first time period, a message written by a composer. The processor may determine to perform impairment analysis on the message. The processor may analyze a first set of usage patterns of a composer's personal device from the first time period. The processor may analyze a second set of usage patterns of the composer's personal device from a second time period. The processor may identify usage habits of the composer based on the analysis of the second set of usage patterns. The processor may identify a difference between the first set of usage patterns and the usage habits of the composer. The processor may determine that the composer was in an impaired state during the first time period, based on the difference. The processor may then display a notification of the difference to the composer after a pre-determined wait time.

Some embodiments of the present disclosure can also be illustrated by a method comprising detecting, during a first time period, a message written by a composer. The method may also include determining whether the message is intended to notify a recipient of an emergency situation based on the content of the message. The method may also include analyzing a first set of usage patterns of a composer's personal device from the first time period. The method may also include analyzing a second set of usage patterns of the composer's personal device from a second time period. The method may also include identifying, based on the analysis of the second set of usage patterns, the composer's usage habits. The method may also include identifying a difference between the first set of usage patterns and the usage habits. The message may also include determining, based on the difference, that the composer was in an impaired state during the first time period. The method may also include determining, based on the determining whether the message is intended to notify a recipient of an emergency situation and based on determining that the composer was in an impaired state, whether to display, through a graphical user interface, a notification of the difference to the user. An intention to notify a recipient of an emergency situation may result in sending the message without a notification, and an absence of an intent to notify a recipient of an emergency situation may result in notifying the composer of the difference.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to textual communication interception, more particular aspects relate to intercepting potentially problematic textual communications. While the present disclosure is not necessarily limited to such applications, various aspects of the disclosure may be appreciated through a discussion of various examples using this context.

As the percentage of the population with constant access to internet-connected devices (e.g., desktop and laptop computers, tablets, smartphones and other smart devices; also referred to as "personal devices") increases, text-based communication (e.g., email, short-message-service messaging (SMS), and instant messaging) becomes increasingly used over other forms of communication (e.g., voice communication over the phone). Further, users of these internet-connected devices are integrating more of their communication media (e.g., personal email, work email, social-media messaging, and stand-alone instant messaging applications) on their internet-connected devices. For many users, this provides a constant, 24-hours-per-day, 7-days-per-week access to all of their communication media. Some of these users may communicate differently over different types of these media (e.g., a user may communicate professionally over his or her work instant-messaging application, but informally over his or her personal instant-messaging application) or may communicate over some media at a time at which it may be inappropriate to communicate over another (e.g., it may be acceptable for a user to communicate over personal email, but not work email, when that user is emotionally unstable). However, with constant access to many of these communication media through the same internet-connected device, some users may accidentally communicate over one medium in a way that is only appropriate over a different medium. Further, some communication media contain error-correction functionality (e.g., autocorrect) that may incorrectly infer the content that a user is intending to include in a message, which could lead to inappropriate message content (e.g., changing an innocuous typo into a profane term). Such "corrections" may go unnoticed by the user, but some embodiments of the present disclosure may be used to detect and notify the user of the corrections before a message is sent.

In some instances, potentially problematic text messages may be sent because of impairment on the part of the composer of the message. Composer impairment may, for example, affect the writing abilities, decision-making abilities, memory, attention to detail, or inhibition of the composer. Examples of impairment include fatigue, stress, emotional instability, or a reaction to medication.

While it may be possible to identify potentially problematic textual messages using natural language processing techniques, in some instances natural language processing may be insufficient or completely unable to detect potential problems with messages sent by a composer. For example, a composer whose decision-making abilities or inhibition is reduced may compose a message to a potential client with a sarcastic tone that natural language processing is unable to detect. A composer who is overly tired or on medication may ask a colleague who has recently been undergoing sensitive family issues "how is the family?" if the composer, due to his or her impaired state, does not remember being told of the family issues.

For these reasons, it may be beneficial to identify potential problems with messages without relying solely on natural language processing techniques. Some embodiments of the present disclosure may achieve this by detecting potential composer impairment by analyzing the composer's usage patterns of a personal device belonging to or used by the composer. For example, some personal devices, such as computers and tablets, may be able to record the accuracy with which a user is able to provide input into the personal device. Other personal devices, such as smartphones with GPS trackers, gyroscopes, or accelerometers, may be able to track the movement of the device while it is being held by the composer. A composer's communication system may have access to the usage information for a personal device of the composer, which may be compared to the composer's previous usage information for that device.

Figure 1:
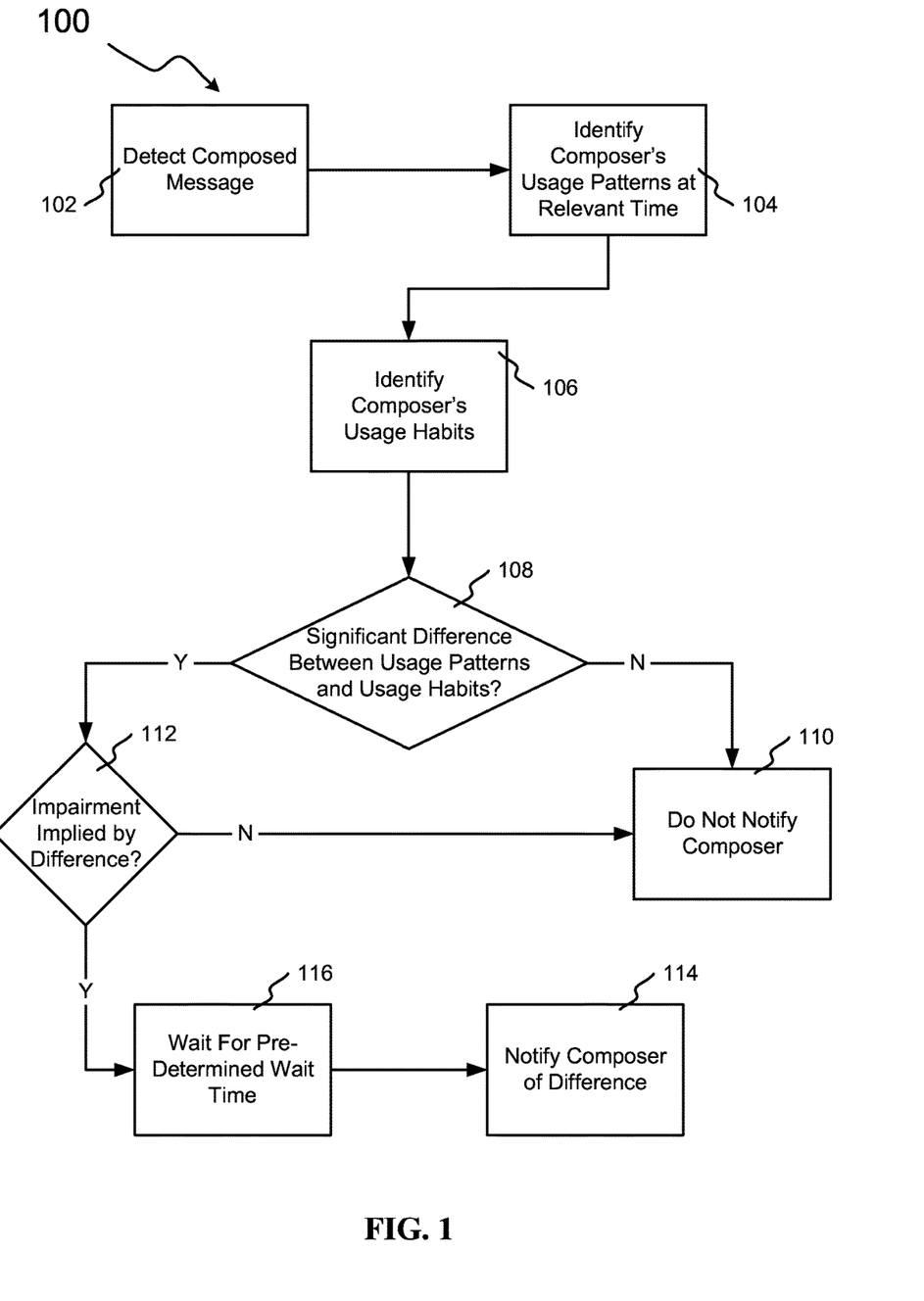
FIG. 1 depicts a method by which a composer may be notified, after a pre-determined wait time, of a difference in usage patterns that may imply user impairment, in accordance with embodiments.

Such an example is illustrated by method 100 in FIG. 1. In block 102, a message is detected. In some embodiments this detection may occur while a composer is in the process of composing the message. In other embodiments the detection may occur once a message is saved (e.g., as a draft message). In other embodiments the detection may occur in response to a composer command (e.g., a composer may click a button in his or her email software requesting the software to perform impairment analysis). In yet other embodiments, the detection may occur once the composer has chosen to send the message. In such embodiments the detection may intercept the message to perform impairment analysis before it is transmitted.

Upon detecting the message, the communication system identifies the composer's usage patterns during the relative time for one of the composer's personal devices in block 104. The timeframe during which the usage patterns may be relevant may depend on several circumstances. For example, in many instances a message may be composed and sent in close proximity, in which case either the time of the message composition or the time of the attempted sending of the message may be sufficient to identify the relevant usage patterns. In other instances, a time delay may exist between the composition of the message and the attempted sending of the message, in which case only one of the time of composition and the time of the attempted sending may be relevant.

For example, a composer may, in an impaired state, compose a message when the composer's communication system is unable to send a message (e.g., the communication system may not have internet access or cellular signal). However, the communication system may automatically attempt to send the message as soon as it has the ability to. In this example, the usage patterns at the time of the message composition may be most relevant, and the usage patterns at the time the message is sent may be less relevant or irrelevant. In other examples, a composer may compose a message when the composer is not impaired, and due to a lack of impairment realizes the message should not be sent, and thus saves it to be edited and sent at a later time. If the composer then revisits the message while impaired, the composer may change his or her mind without due consideration and send the message as is. In this example, the usage patterns at the time of message composition may not be relevant, but the usage patterns at the time of the send attempt may be very relevant.

Usage patterns may involve any of, for example, motion patterns of a personal device, how often the composer deletes content while writing the message (e.g., if the composer is not planning the message content effectively), how often a composer relies on suggested changes to content (e.g., autocorrect suggestions of spelling errors or autocomplete suggestions of incomplete words), and the number of attempts it takes a composer to complete an interaction with the personal device (e.g., if the composer is repeatedly contacting the non-interactive space surrounding an icon on the touchscreen of a tablet or smartphone, imprecisely navigating with the mouse cursor on a computer, or losing track of the task at hand and navigating to and exiting out of several applications in a short period of time) at the relevant time. For example, the composer may use a smartphone with motion-tracking capabilities, in which case the communication system may identify the motion patterns of the smartphone. In some instances the message may exhibit impeccable spelling and grammar, but the composer may have made several mistakes that required deleting or replacing during the composition. This may be detected if the communication system has access to the composer's keystroke history or composition choices (e.g., the communication system may detect the composer repeatedly pressing a "delete" or "backspace" button during message composition or by relying heavily on an "autocorrect" function). In some embodiments this personal device may be the device on which the message is written, but in other embodiments the message may be written on a different device.

Some usage patterns may be relevant for particular participants or categories of participants. For example, a composer may send messages to his or her coworkers only during his or her workday (e.g., Monday through Friday from 8 AM until 5 PM). The time at which this composer composes or sends a message to his or her coworkers may then be a relevant usage pattern (e.g., if the composer writes and sends a message to a coworker at 2 AM on Saturday morning, it may be an indicator of impaired judgment). A composer may also typically only send a message to any single recipient at a certain frequency (e.g., one message per hour). The frequency with which this composer composes or sends messages to each recipient may then be a relevant usage pattern (e.g., if the composer is suddenly emailing a recipient an average of once every 30 seconds, it may be an indicator that the composer is not thinking clearly). The length of the messages sent to particular participants or categories of participants may be a relevant usage pattern. A composer may typically only send messages that are between 10 and 40 words to a colleague, for example. If the composer composes a message to that colleague that is 400 words long, it may indicate that the composer is unfocused and sending a confusing message, or irate and sending an angry, embarrassing message, as a result.

Once the composer's usage patterns for the relevant time (e.g., during message composition, at message send time, for a time period surrounding the message composition or message send time, or any combination thereof) are identified, the composer's corresponding usage habits may be identified in block 106. In some embodiments the communication system may do this by analyzing one or more sets of usage patterns for any period of time outside the time period used in block 104. For example, if the message was written several days prior to being sent (e.g., if the communication system did not have access to the internet when the message was composed), the composer's usage before and after the day on which the message was composed may be analyzed. If, however, the message was composed and sent at approximately the same time, the composer's usage before the composition (e.g., for one week before the day on which the composition occurred) may be analyzed. The analysis of these usage patterns may be used to identify the composer's usage habits.

Once the composer's usage habits are identified in block 106, the communication system determines in block 108 whether there is a significant difference between the composer's set of usage patterns at the relevant time and the composer's identified usage habits. In some embodiments, this may involve identifying a behavior and determining how often that behavior occurs in the set of usage patterns and the usage habits. A behavior may be, for example, the act of changing the acceleration of a phone (e.g., as an overly tired composer or a medicated composer attempts to hold the phone, or his or her body, steady) above a certain threshold (e.g., above 0.2 m/s$^3$) may be tracked by the communication system, which may then determine the number of times the behavior occurred each minute during the relevant time and in the composer's usage habits. The behavior may also be hitting the "delete" or "backspace" key a threshold number of times in a row (e.g., 1), which the communication system may track per period of time (e.g., per minute) or per unit of text (e.g., per word, per sentence, and per message). The behavior may also be accepting a personal device's suggestion of a substitute word for a word that the composer has misspelled (e.g., accepting a computer's autocorrect suggestion). The communication system may thus track, for example, how many times the composer accepted an autocorrect suggestion while composing the message, and how many times the composer accepts autocorrect suggestions per message in the composer's identified usage habits.

The difference between the number or degree of occurrences of an identified behavior in the set of usage patterns and the set of usage habits may be significant, for example, if it is above a pre-determined threshold. In some embodiments this pre-determined threshold may be a deviation in number of occurrences or a percentage deviation. In some embodiments the difference may be based on a deviation from a mean value (e.g., the average occurrence or degree in the usage habits) or median value (e.g., the middle value in a list of data sets, such as a list of number of instances of a behavior each day). For example, if a composer's usage habits show that he or she has accepted a personal device's suggestion of a substitute word 20, 25, 30, 35, and 40 times in the past 5 days respectively, the median value would be 30 times per day, and the threshold for a difference to be significant may be 40 (i.e., 70 or greater total instances of the behavior). If a composer's usage habits show that he or she, on average, accelerates his or her personal device greater than above 0.2 m/s$^2$ in two instances per hour, the threshold for a difference to be significant may be at least a 100% deviation (i.e. a total of zero instances per hour or a total of greater than four instances per hour).

In some embodiments differences in behavior may not be significant individually, but may be significant when considered together. For example, a composer's motion patterns and number of uses of the "delete" key may both be below their respective thresholds, but may result in a significant difference when considered together. In some embodiments the identified differences for multiple behaviors may be added together. This may be done, in some embodiments, by calculating the proximity to the significance threshold (expressed as a percentage) for each difference in behavior and adding the proximities together. For example, if a first behavior is 30% below its respective threshold (e.g., a difference of 7 occurrences with a 10-occurrence threshold) and a second behavior is 50% below its respective threshold, (e.g., a difference of 120% above or below a mean with a 240% threshold), the first behavior would show a 70% proximity to its significance threshold, and the second behavior would show a 50% proximity to its significance threshold. These proximities may be added to a total proximity of 120%, or 20% above the total significant-difference threshold. Thus, these two differences together would trigger the significance threshold, even though no difference individually is significant.

In some embodiments the total proximity to the threshold may be adjusted based on the quantity of differences identified (i.e., the number of behaviors that exhibit a difference between usage patterns and usage habits). For example, if three differences together result in a combined 95% proximity to the total significant-difference threshold, but each difference in behavior above 1 adds a 0.03 multiplier, the total adjusted proximity would be 100.7% (0.95*(1+0.03+0.03)=1.007). This total adjusted proximity, because it is over 100%, would trigger the significance threshold. Thus, these three differences together, when adjusted, would trigger the significance threshold, even though no difference individually is significant and the combined differences are not significant.

If a significant difference is not identified in block 108 between the composer's identified set of usage patterns during the relevant time and the composer's identified usage habits, the communication system does not notify the composer in block 110. In some embodiments this may include sending the message, saving the message as a draft, or taking no action with respect to the message and awaiting further instruction from the composer.

If, however, a significant difference is identified in block 108, the communication system determines in block 112 whether an impairment is implied by the difference. In some embodiments this may be impacted by the type of usage in which a difference was identified. For example, a significant difference may be identified between the number of times a composer relies on a communication system's suggestion of a word or phrase as the composer is typing the word or phrase (e.g., autocomplete functionality). However, the use of autocomplete functionality may not be correlated with composer impairment in the absence of errors typing the word or phrase, and thus the difference in the behavior would not imply composer impairment. If the difference does not imply composer impairment, the communication system proceeds to block 110.

However, the use of a substitution-suggestion functionality for misspelled words or other typographical errors may be correlated with composer impairment. Thus, a significantly higher incidence of accepting suggested substitutions while typing the message than the incidence shown in the usage habits may imply composer impairment while typing the message.

If composer impairment is implied by the difference, the communication system may determine to notify the composer of the potential impairment, but in some instances the impairment that resulted in the difference would also impede the composer's ability to make a decision regarding the difference. Thus, in this embodiment, if a composer's communication system determines that composer impairment is implied by the difference in block 112, the communication system waits for a pre-determined wait time in block 116. Different impairments may require different amounts of wait time, and thus in some embodiments the amount of the wait time may depend on the impairment that was implied in block 112. For example, if it is determined that the composer is likely overstressed or emotionally unstable (e.g., angry due to traffic on the way to the office), the communication system may wait four hours, at the end of which time the composer may have recovered from his or her stress or emotional instability. If the composer is likely overtired, the communication system may wait two hours, after which time the composer may have taken a nap or consumed a caffeinated beverage. For this reason, the amount of the pre-determined wait time may vary based on the type of difference identified in block 108 (e.g., differences in motion patterns, reliance on autocorrect, or the time at which the message was composed or sent), the magnitude of the difference identified in block 108 (e.g., the percentage by which the difference exceeds the significance threshold), and other factors. The amount of the pre-determined wait time may also be set or altered by settings in the composer's communication system. In some embodiments, the composer may cancel the pre-determined wait time by, for example, accessing the message in the composer's outbox during the pre-determined wait time and instructing the communication system to send the message in spite of the pre-determined wait time.

After the pre-determined wait time has expired, the communication system notifies the composer in block 114 of the difference identified in block 108. In some embodiments this may include only a generic notification that informs a composer that an impairment was implied during the relevant time, but may give no further information. In other embodiments the composer may be informed of the usage difference or differences that were identified in the analysis, and the magnitude of those differences. In some embodiments the communication system may also inform the composer of the type of impairment that was implied.

In some embodiments, a composer's communication system may be configured to perform impairment analysis on a message only if that message falls into (or does not fall into) a certain category. In some such embodiments, meta-data tags may be associated with each message to specify the categories into which that message may be classified. For example, a composer may configure his or her communication system to only perform impairment analysis on messages addressed to particular recipients (e.g., the composer's supervisor or supervisors) or not addressed to particular recipients (e.g., the composer's significant other). Each message may then be classified into a category based on the recipient or recipients of the message (e.g., the message may be associated with a meta-data tag that specifies, for example, "to: [Recipient A]" or "to: [Recipient B and C]"). The communication system may then configured to perform impairment analysis only on messages with particular recipient meta-data tags, or only on messages without particular recipient meta-data tags.

A composer may also configure his or her communication system to only perform impairment analysis on messages addressed to recipients that are determined to be of a particular recipient type (e.g., the composer's coworkers) or not of that particular recipient type (e.g., not family members of the composer). For example, if the message is an email sent from the composer's work email address, any email written to a recipient with an email address exhibiting a different domain name may be a client or prospective client of the composer. Any such recipient may be placed in an "outside organization" recipient-type category. In similar embodiments a communication system may have access to the composer's address-book information, and may utilize that information to assign recipients to recipient-type categories. For example, a composer may list a message recipient as his or her brother-in-law in his address book, in which case the communication system may categorize that recipient in a "family" recipient-type category. The communication system may then configured to perform impairment analysis only on messages with, or without, particular recipient-type meta-data tags.

In some embodiments social-media information may also be used to determine the recipient-type category of a composed-message recipient. The communication system may look up the recipient on social-media services by, for example, email or name. For example, a composer may have a recipient of a message listed as his or her coworker or his or her father on his or her social media profile. The communication system may then determine that the recipient is in the "coworker" recipient-type category or the "family" recipient-type category respectively. In some embodiments the content of previous messages, social media or otherwise, may be available, in which case information from the messages may be used to derive recipient-type categories. For example, a composer may regularly send messages to a recipient with the same last name (e.g., as part of an email name, address-book entry, or social-media profile name) as the composer, and refer to that person as "bro" or "sweetheart" in the messages. In those cases the communication system may infer that the recipient is in the "family" recipient-type category.

A composer may also configure his or her communication system to only perform impairment analysis on messages sent using particular communication media (e.g., the composer's social-media account or work email account). In some such embodiments the communication medium may be assigned to a communication-medium category. For example, a social-media messaging system may be assigned to a "personal" or "informal" communication-medium category. The communication system may then configured to perform impairment analysis only on messages with, or without, particular communication-medium meta-data tags.

In embodiments in which impairment analysis is intended to be performed only on messages that do not fall into a certain category (e.g., not to the recipient's significant other) the composer may establish the certain category as a black-list message category. This could be performed by attaching black-list meta-data tags to messages. For example, a composer may not want impairment analysis to be performed on any message addressed to his or her family members. If a black-list meta-data tag "to: family," were established and associated with any message sent to a family member of the composer, the communication system would not perform impairment analysis on that message. In some such embodiments, any message that does not have a black-list meta-data tag attached may be analyzed for impairment. In other embodiments black-list meta-data tags may be compared with "standard" meta-data tags to determine whether impairment analysis is to be performed on a message. These "standard" meta-data tags, when referred to in comparison to black-list meta-data tags, may be referred to as white-list meta-data tags.

For example, in some embodiments the composer may assign ranks to different message categories, or the associated tags, to help determine whether impairment analysis is to be performed on a message with conflicting meta-data tags. For example, a composer's communication system may be configured to perform impairment analysis on any message sent from the composer's social-media account (e.g., to which a "sentfrom: social media" white-list meta-data tag is attached) and sent to the composer's coworkers (e.g., to which a "sentto: coworkers" white-list meta-data tag is attached), but not perform impairment analysis on any message sent to the composer's brother (e.g., to which a "sentto: [brother's name]" black-list meta-data tag is attached), who happens to be the composer's coworker. If either the "sentfrom: social media" or the "sentto: coworkers" white-list tag were ranked higher than the "sentto: [brother's name]" black-list tag, any message sent to the composer's brother's work email address from the composer's social-media account would undergo impairment analysis. However, if the "sentto: [brother's name]" tag were ranked higher than both the "sentfrom: social media" and "sentto: coworkers" tags, a message sent to the composer's work email address from the composer's social-media account would not undergo impairment analysis.

Figure 2:
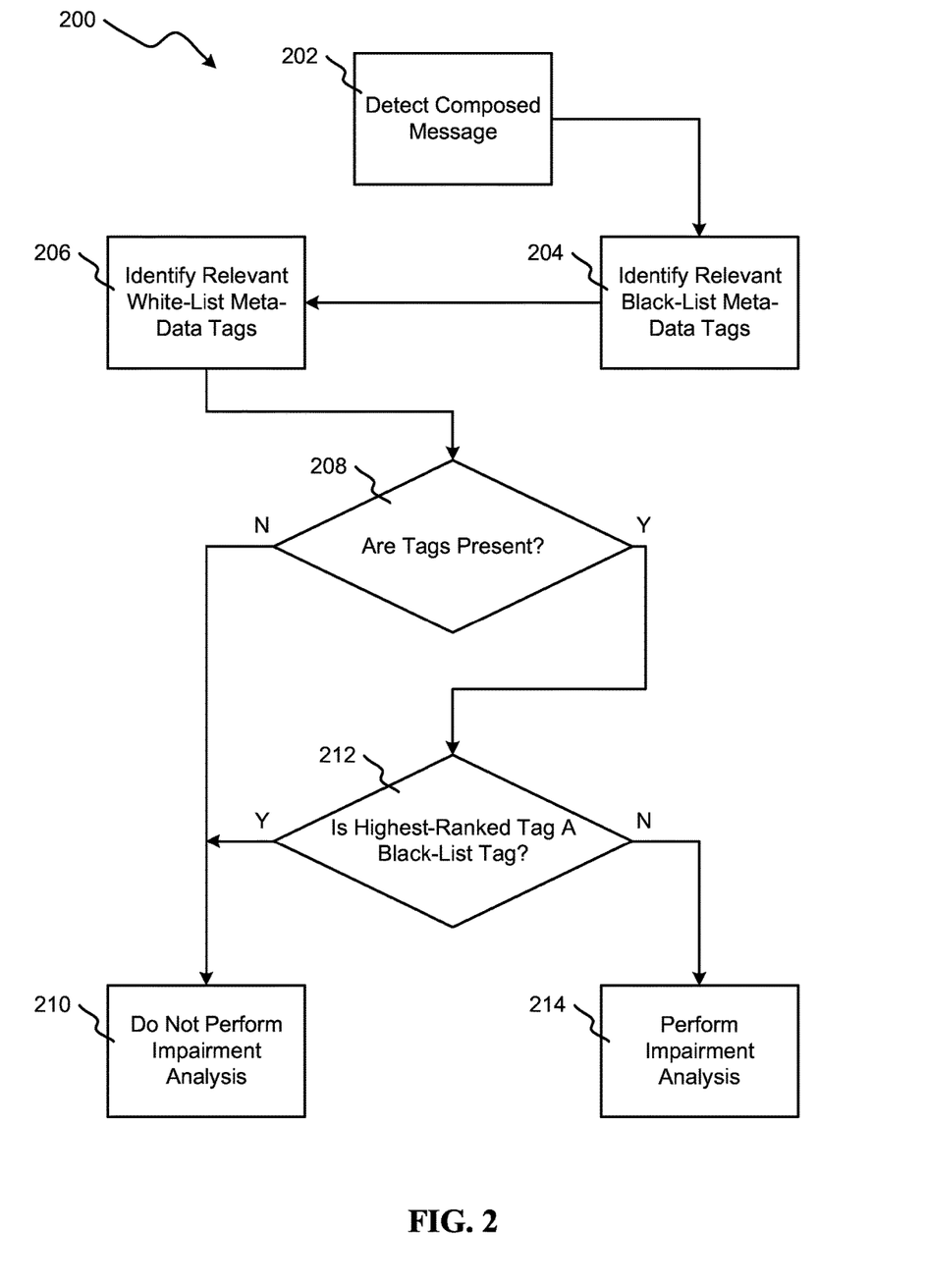
FIG. 2 depicts a method by which a composer's communication system determines whether to perform impairment analysis on a message by comparing ranks of white-list meta-data tags and black-list meta-data tags associated with the message, in accordance with embodiments.

An example embodiment in which the ranks of white-list meta-data tags and black-list meta-data tags are compared is shown in FIG. 2. In FIG. 2, method 200 determines whether impairment analysis is to be performed on a message. Method 200 begins when a message is detected in block 202. After a message is detected the composer's communication system identifies black-list meta-data tags in block 204 that are relevant to the message, and identifies white-list meta-data tags in block 206 that are also relevant to the message.

In block 208 the communication determines whether any tags were identified in blocks 204 or 206. If no, the communication system decides in block 210 to not perform impairment analysis on the message. Note, however, that in some embodiments, the communication system may default to performing impairment analysis when no tags are identified. If, however, tags were identified in blocks 204 or 206, the communication system determines in block 212 whether the highest-ranked tag is a black-list tag. If no (e.g., if a white-list meta-data tag is ranked higher, or if only a white-list meta-data tag is identified), the communication system determines in block 214 to perform impairment analysis on the message. If, however, the highest-ranked tag is a black-list meta-data tag, the communication system decides in block 210 to not perform impairment analysis on the message.

In some embodiments, the composer may assign specific sensitivity values to message categories (e.g., by attaching values to the corresponding meta-data tags) to help determine whether impairment analysis is to be performed on a message with conflicting meta-data tags. In some such embodiments, these sensitivity values may be compared to each other to determine whether the message's sensitivity rating is beyond (i.e., above or below) a pre-determined sensitivity threshold. Messages with sensitivity ratings that are beyond the sensitivity threshold (e.g., that are greater than the threshold) may then be selected for impairment analysis.

For example, all messages may be assigned a base sensitivity rating of 0 points. Any message-category meta-data tags associated with each message may increase or decrease that message's sensitivity rating based on whether those message-category meta-data tags have been assigned a positive or negative value in the communication-system configurations. For example, a positive value may be applied to message categories on which impairment analysis is not to be performed, and a negative value may be applied to message categories on which impairment analysis is to be performed. Using the previous example, the "sentfrom: social media" meta-data tag may have a sensitivity value of −4, the "sentto: coworkers" meta-data tag may have a sensitivity value of −20, and the "sentto: [brother's name]" meta-data tag may have a sensitivity value of 21. Thus, a message sent to the composer's brother's work email address (assuming, again, that the composer and brother are coworkers) from the composer's social-media account would have a total sensitivity rating of −3 (0−4−20+21=−3). If, then, the communication-system were configured to perform impairment analysis on any message with a sensitivity rating below −1 (i.e., below the sensitivity threshold of −1), impairment analysis would be performed on the message. If, however, the communication system were configured to perform impairment analysis only on messages with a sensitivity rating below −5, impairment analysis would not be performed on the message.

Figure 3:
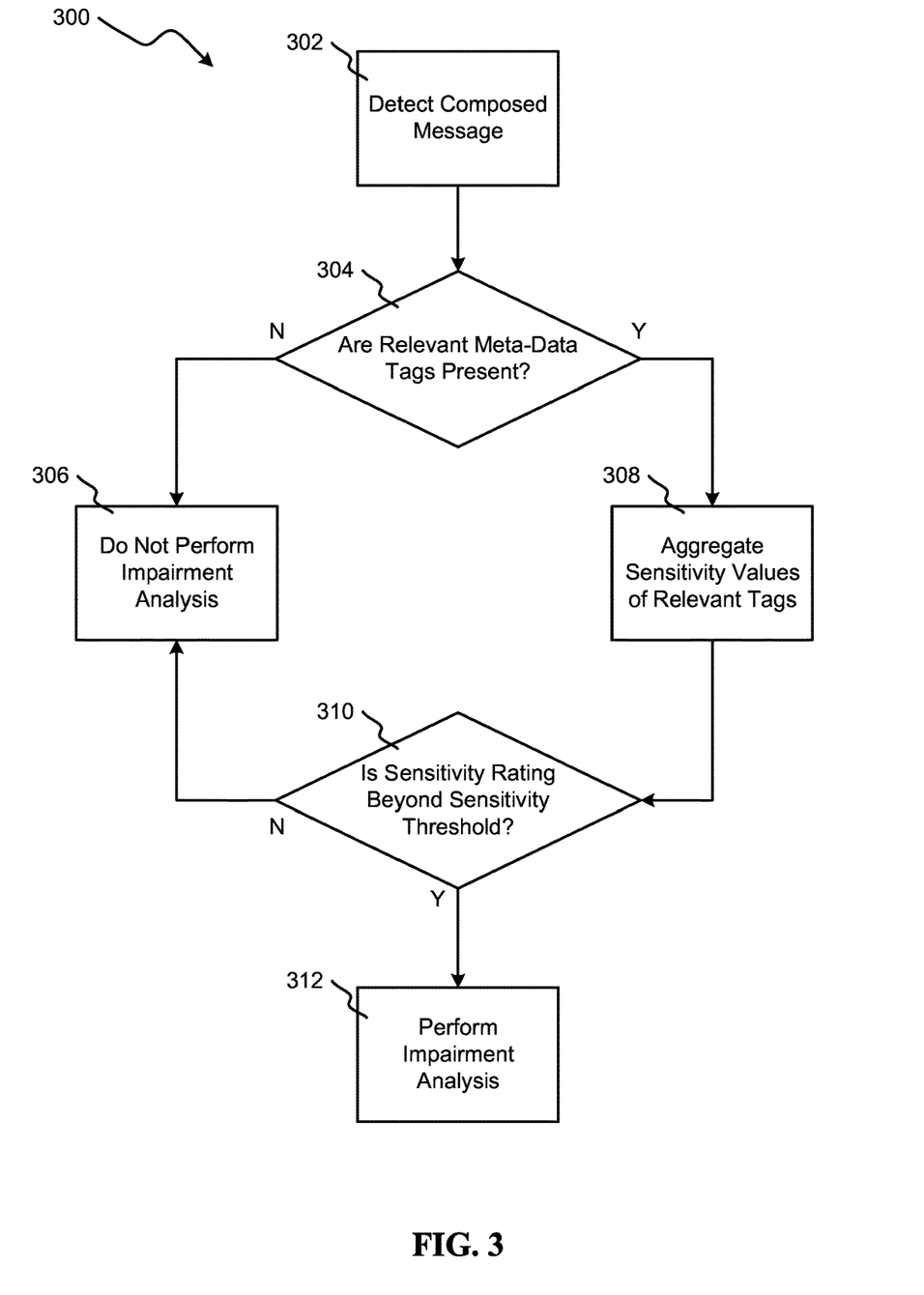
FIG. 3 depicts a method by which a composer's communication system determines whether to perform impairment analysis on a message by determining the sensitivity rating of the message, in accordance with embodiments.

An example embodiment in which the sensitivity values of message categories (e.g., written to a particular class of recipients or sent using a particular communication medium) are compared is shown in FIG. 3. In FIG. 3, method 300 determines whether impairment analysis is to be performed on a message. Method 300 begins when a message is detected in block 302. The communication system determines in block 304 whether any meta-data tags that are relevant to the message's sensitivity value are associated with the message (e.g., the meta-data tag "sentto: customer"). If no relevant meta-data tags are present (e.g., if no meta-data tags are associated with the message or if all meta-data tags associated with the message do not specify a sensitivity value), the communication system determines in block 304 to not perform impairment analysis on the message. Note, however, that in some embodiments, the communication system may default to performing impairment analysis when no relevant tags are identified.

If, however, relevant meta-data tags are associated with the message, the communication system determines the sensitivity rating of the message by aggregating the sensitivity values of the relevant meta-data tags in block 308. The communication system then compares the message's sensitivity rating with a pre-determined sensitivity threshold in block 310. If the message's sensitivity rating is beyond the sensitivity threshold, the communication system performs impairment analysis on the message in block 312. If the message's sensitivity rating is not beyond the sensitivity threshold, however, the communication system determines to not perform impairment analysis on the message in block 306.

Some embodiments of the present disclosure may interrupt the sending of a message to notify a composer of potential problems with the message. Some such embodiments may not notify the composer until after a pre-determined wait time. However, in instances in which a message is meant to notify a recipient of an emergency situation, interrupting the sending of a message may be undesirable. Thus, in some embodiments, the communication system may employ natural-language processing to determine whether a message is likely to be sent due to an emergency situation, in which case the notification or wait-time functions may be bypassed. For example, the communication system may scan the message content for emergency-indicating keywords, such as "help," 'police," or "emergency." In these instances, the message may be sent upon the composer issuing a "send" command, regardless of stylistic differences or differences that may imply composer impairment.

In some embodiments external sources may be used in addition to or in place of natural-language processing to determine whether a message is likely to be sent due to an emergency situation. For example, a composer's location at the time a message is sent (which may be available, for example, from the GPS capabilities of a personal device belonging to the composer) may be cross referenced against publicly available reports of current emergencies (e.g., police reports, postings on news websites, locations of traffic accidents). In some such embodiments, the communication system may determine to send the message without any processing if the composer's location is significantly close to a reported emergency (e.g., within 100 feet of a traffic accident). In other embodiments, the communication system may also analyze the message using natural-language processing to determine if the message content is relevant to the emergency. In some such embodiments, the message may be interrupted (e.g., if a significant difference between writing style and writing habits is identified) if the message content appears to have nothing to do with an emergency (e.g., if no emergency-indicating keywords are identified in the message).

In further embodiments sources such as social media may be utilized in addition to or in place of one or both of natural-language processing and publicly-available reports. In some embodiments the composer's city of residence may be known, in which case the communication system may scan social-media sources to identify posts about emergencies in that city. For example, natural emergencies such as earthquakes or tornadoes may be identified by scanning popular social media topics for terms such as "earthquake," "ground shook," tornado," "funnel cloud," etc. In embodiments in which a potential emergency situation is identified using social-media sources, a message may be sent before being processed, and thus may not be interrupted. In other embodiments, the communication system may also analyze the message using natural-language processing to determine if the message content is relevant to the emergency. In some such embodiments, the message may still be interrupted if composer impairment is likely and if the message content appears to have nothing to do with an emergency (e.g., if no emergency-indicating keywords are identified in the message).

Some embodiments of the present disclosure utilize a composer's usage patterns or usage habits when determining whether the composer may be impaired. In these embodiments, the terms "patterns" and "habits" should be read to incorporate either the plural form or the singular form (i.e., "pattern" and "habit"). For example, embodiments that identify usage patterns of a composer should also be read to describe identifying a single usage pattern of the composer.

Figure 4:
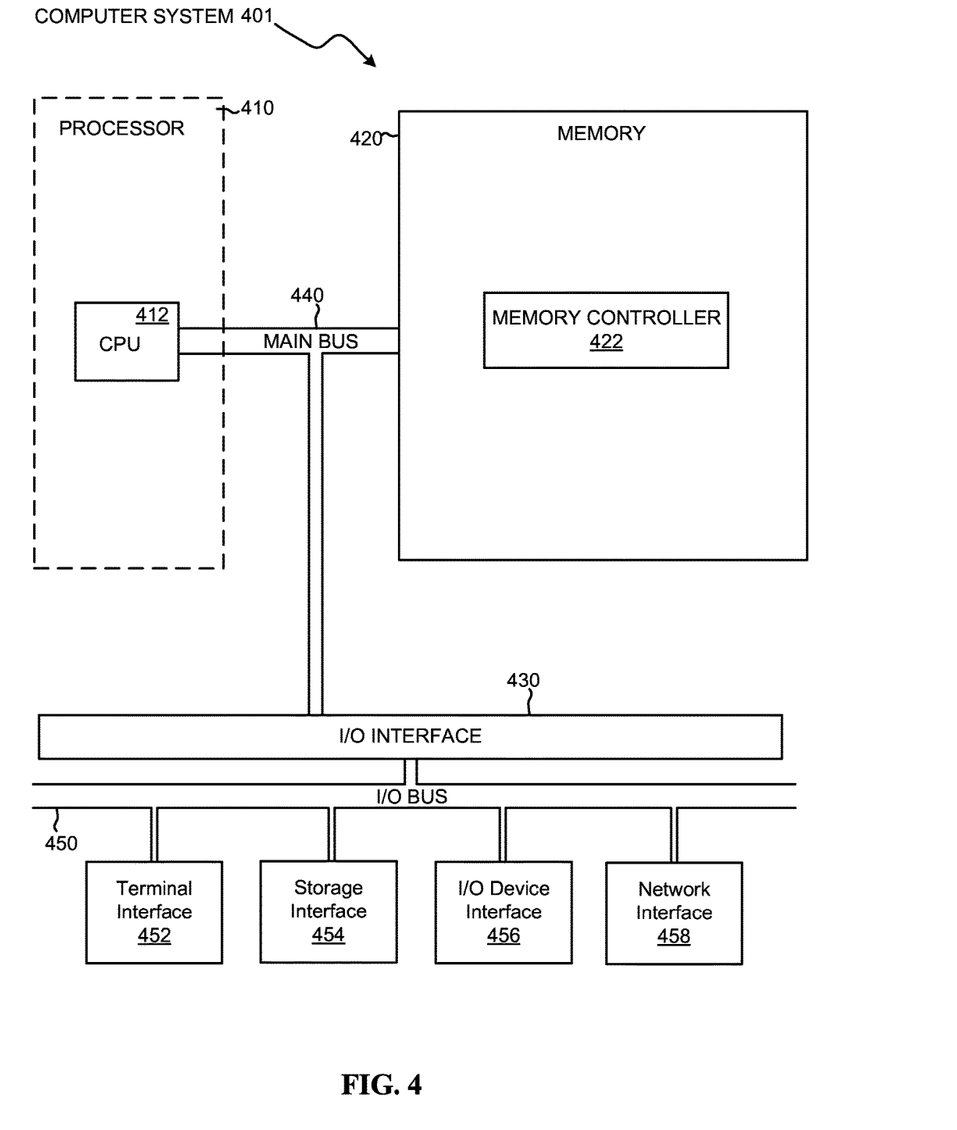
FIG. 4 depicts the representative major components of a computer system that may be used in accordance with embodiments.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, by a processor, during a first time period, a message written by a composer;
   intercepting, by the processor and in response to a command by the composer to send the message, the message before the message is transmitted;
   identifying, by the processor, a set of message-category meta-data tags associated with the message;
   identifying, by the processor, a particular sensitivity value of each particular message-category meta-data tag in the set of message-category meta-data tags, wherein a magnitude of a positive sensitivity value applied to a meta-data tag indicates the degree to which impairment analysis is not to be performed, and the magnitude of a negative sensitivity value applied to a meta-data tag indicates the degree to which impairment analysis is to be performed;
   aggregating, by the processor, the particular sensitivity values, resulting in a sensitivity rating for the message;
   calculating, by the processor, that the sensitivity rating is below a sensitivity-rating threshold;
   determining, by the processor, to perform impairment analysis on the message based on the calculating;
   analyzing, by the processor and based on the determining to perform impairment analysis, a first set of usage patterns of a composer's personal device, wherein the first set of usage patterns comprises the frequency with which the composer deleted content of the message during the first time period and the frequency with which the composer relied on changes, suggested by the personal device, to content of the message during the first time period;
   analyzing, by the processor, a second set of usage patterns of the composer's personal device, wherein the second set of usage patterns corresponds to a second time period that is not the same as the first time period, wherein the second set of usage patterns comprises the frequency with which the composer deleted content during the second time period and the frequency with which the composer relied on changes, suggested by the personal device, to content during the second time period;
   identifying, by the processor and based on the analyzing the second set of usage patterns, usage habits of the composer;
   identifying, by the processor, a set of differences between the first set of usage patterns and the usage habits of the composer;
   identifying, by the processor, a first difference in the set of differences, wherein the first difference comprises the difference between the frequency with which the composer deleted content of the message during the first time period and the frequency with which the composer deleted content during the second time period;
   identifying, by the processor, a second difference in the set of differences, wherein the second difference comprises the difference between the frequency with which the composer relied upon changes, suggested by the personal device, to content of the message during the first time period and the frequency with which the composer relied on changes, suggested by the personal device, to content during the second time period;
   adding, by the processor, at least the first difference to the second difference, resulting in a summed difference;
   adjusting, by the processor, the summed difference based on the quantity of differences identified in the set of differences, resulting in an adjusted summed difference;
   determining, by the processor, that the adjusted summed difference is above a significance threshold, wherein the value of the adjusted summed difference relative to the significance threshold implies whether the composer was likely to be in an impaired state during the first time period;
   concluding, by the processor and based on the determining, that the composer was in an impaired state during the first time period;
   displaying, by the processor and through a graphical user interface, a notification of the conclusion that the composer was in an impaired state to the composer after a pre-determined wait time, wherein the message is not transmitted during the pre-determined wait time; and
   receiving, by the processor, a command from the composer to delete the message after the notification.

* * * * *